United States Patent
Li et al.

(10) Patent No.: US 8,139,301 B1
(45) Date of Patent: Mar. 20, 2012

(54) DISK DRIVE COMPRISING A DUAL READ ELEMENT AND DELAY CIRCUITRY TO IMPROVE READ SIGNAL

(75) Inventors: Shaoping Li, San Ramon, CA (US); Yimin Guo, San Jose, CA (US); Francis H. Liu, Fremont, CA (US); Sining Mao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 145 days.

(21) Appl. No.: 12/507,294

(22) Filed: Jul. 22, 2009

(51) Int. Cl.
*G11B 5/09* (2006.01)
*G11B 20/10* (2006.01)

(52) U.S. Cl. ........................................ 360/39; 360/51
(58) Field of Classification Search ................... None
See application file for complete search history.

(56) References Cited

U.S. PATENT DOCUMENTS

| | | |
|---|---|---|
| 4,012,781 A | 3/1977 | Lin |
| 5,270,892 A | 12/1993 | Naberhuis |
| 5,309,305 A | 5/1994 | Nepela et al. |
| 5,388,014 A | 2/1995 | Brug et al. |
| 5,508,868 A | 4/1996 | Cheng et al. |
| 5,684,658 A | 11/1997 | Shi et al. |
| 5,696,654 A | 12/1997 | Gill et al. |
| 5,721,008 A | 2/1998 | Huang et al. |
| 5,796,535 A | 8/1998 | Tuttle et al. |
| 5,831,888 A | 11/1998 | Glover |
| 5,963,400 A | 10/1999 | Cates et al. |
| 6,104,562 A | 8/2000 | Ottesen et al. |
| 6,111,717 A | 8/2000 | Cloke et al. |
| 6,154,335 A | 11/2000 | Smith et al. |
| 6,157,510 A | 12/2000 | Schreck et al. |
| 6,191,925 B1 | 2/2001 | Watson |
| 6,449,131 B2 | 9/2002 | Guo et al. |
| 6,469,878 B1 | 10/2002 | Mack et al. |
| 6,496,333 B1 | 12/2002 | Han et al. |
| 6,674,618 B2 | 1/2004 | Engel et al. |
| 6,987,408 B2 | 1/2006 | Kim |
| 7,259,927 B2 * | 8/2007 | Harris ............................ 360/48 |
| 7,271,970 B2 | 9/2007 | Tsuchiya |
| 7,436,632 B2 | 10/2008 | Li et al. |

* cited by examiner

*Primary Examiner* — Daniell L Negron

(57) ABSTRACT

A disk drive is disclosed comprising a disk having a plurality of data tracks, and a head actuated over the disk, the head comprising a first read element and a second read element. A data track is read to generate a first read signal emanating from the first read element and a second read signal emanating from the second read element. The first read signal is delayed relative to the second read signal to generate a delayed read signal, and the second read signal is combined with the delayed read signal to generate a combined read signal. An estimated data sequence is detected from the combined read signal.

8 Claims, 5 Drawing Sheets

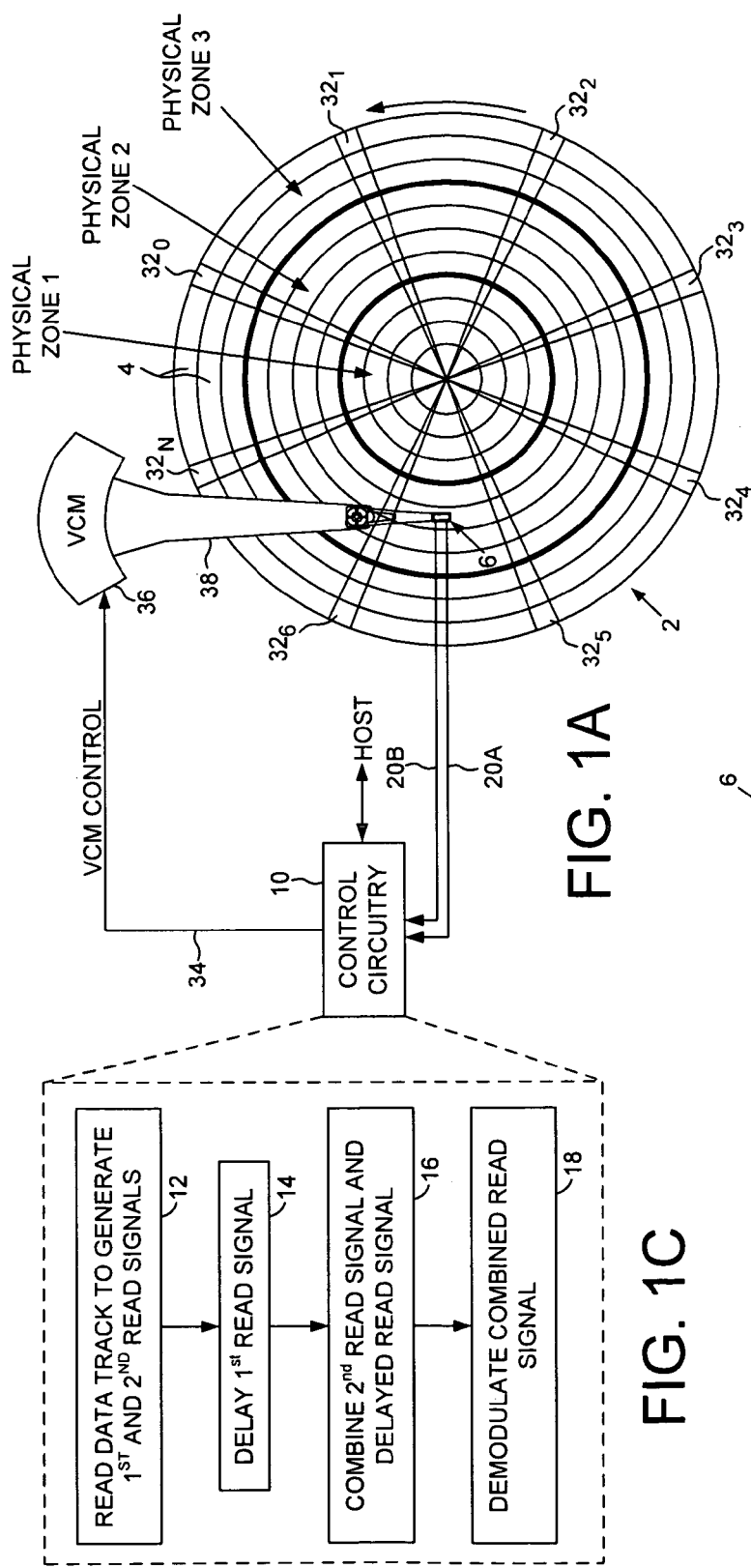

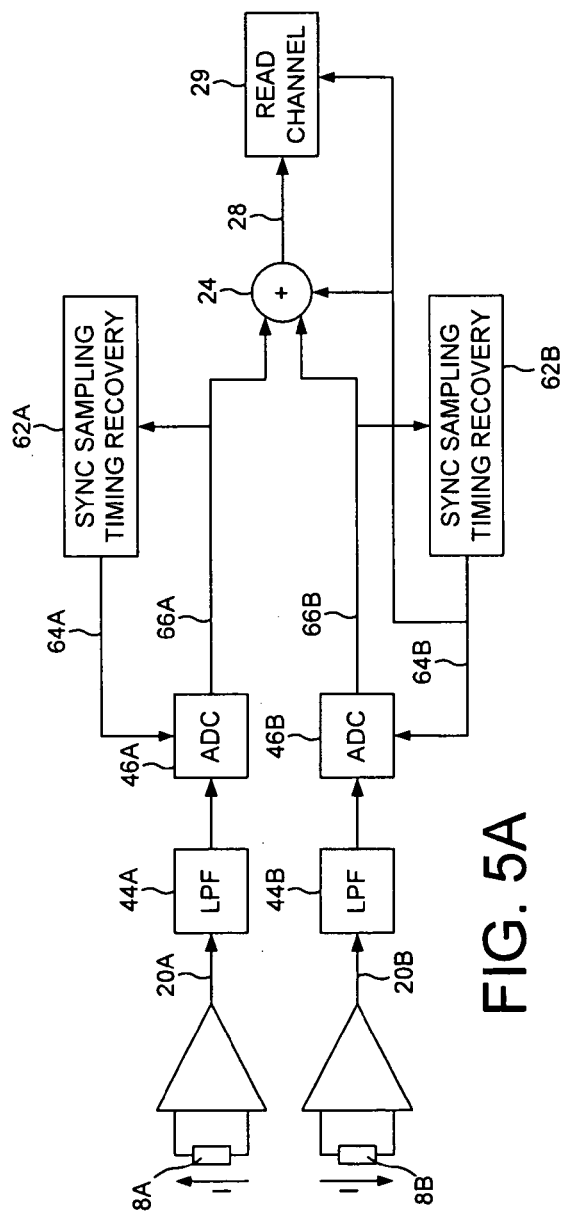
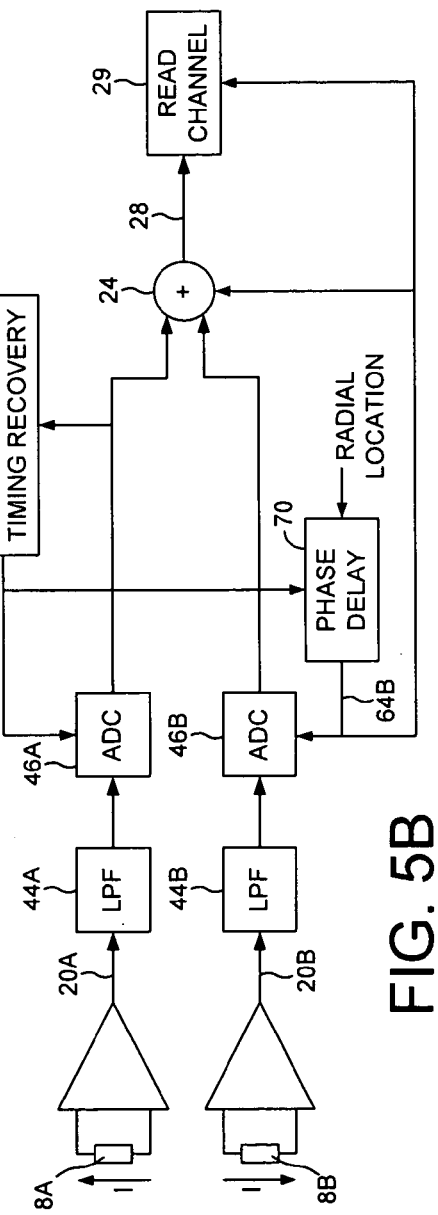
FIG. 5A
FIG. 5B

DISK DRIVE COMPRISING A DUAL READ ELEMENT AND DELAY CIRCUITRY TO IMPROVE READ SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

BRIEF DESCRIPTION OF THE DRAWINGS

FIG. 1A shows a disk drive according to an embodiment of the present invention including a head actuated over a disk.

FIG. 1B shows an embodiment of the present invention wherein the head comprises a first read element and a second read element for generating first and second read signals FIG. 1C shows a flow diagram according to an embodiment of the present invention wherein the first read signal is delayed relative to the second read signal, the second read signal and the delayed read signal are combined, and the combined read signal is demodulated.

FIG. 5A shows control circuitry according to an embodiment of the present invention wherein both the first and second read signals are synchronized using synchronous sampling timing recovery circuits.

FIG. 5B shows control circuitry according to an embodiment of the present invention wherein the first read signal is synchronized using a synchronous sampling timing recovery circuit, and the resulting sampling clock delayed with a digital delay circuit to sample the second read signal.

DETAILED DESCRIPTION OF EMBODIMENTS OF THE INVENTION

Figure 2A:
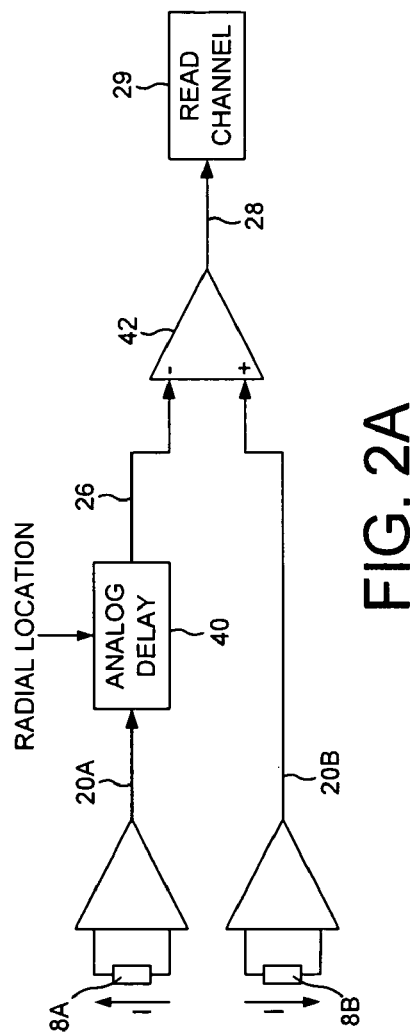
FIG. 2A shows an embodiment of the present invention wherein the first read signal is delayed in continuous time using an analog delay circuit.

FIG. 1A shows a disk drive according to an embodiment of the present invention comprising a disk 2 having a plurality of data tracks 4, and a head 6 actuated over the disk 2, the head 6 comprising a first read element 8A and a second read element 8B (FIG. 1B). The disk drive further comprises control circuitry 10 for executing the flow diagram of FIG. 1C. A data track is read to generate a first read signal emanating from the first read element and a second read signal emanating from the second read element (step 12). The first read signal is delayed relative to the second read signal to generate a delayed read signal (step 14), and the second read signal is combined with the delayed read signal to generate a combined read signal (step 16). An estimated data sequence is detected from the combined read signal (step 18).

The head 6 shown in FIG. 1B may comprise any suitable geometry and may be fabricated using any suitable technique. In addition, each read element 8A and 8B may comprise any suitable magnetic sensor, for example a magnetoresistive (MR) sensor such as a spin valve sensor or a tunnel injection sensor. The embodiments of the present may also be employed with longitudinal magnetic recording, perpendicular magnetic recording, or any other suitable magnetic recording technique.

In the embodiment shown in FIG. 1B, the first read element 8A is offset from the second read element 8B along the length of a data track. Accordingly, as a data track passes under the head 6, the magnetic transitions are first sensed by the first read element 8A to generate a first read signal 20A, and then by the second read element 8B to generate a second read signal 20B. Therefore, in one embodiment the first read signal 20A is delayed using suitable delay circuitry 22 so that it substantially aligns in phase with the second read signal 20B. The second read signal 20B is combined 24 with the delayed read signal 26 to generate a combined read signal 28 that is demodulated to detect an estimated data sequence using suitable read channel circuitry.

In the embodiment of FIG. 1A, the disk 2 comprises a plurality of servo sectors $32_0$-$32_N$ that define the plurality of data tracks 4. The control circuitry 10 processes the combined read signal 28 to demodulate the servo sectors $32_0$-$32_N$ into a position error signal (PES). The PES is filtered with a suitable compensation filter to generate a control signal 34 applied to a voice coil motor (VCM) 36 which rotates an actuator arm 38 about a pivot in order to position the head 6 radially over the disk 2 in a direction that reduces the PES. The servo sectors $32_0$-$32_N$ may comprise any suitable position information, such as a track address for coarse positioning and servo bursts for fine positioning.

In one embodiment the disk 2 is rotated at a constant angular velocity, and therefore the data rate is increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1A, which shows the data tracks banded together in this example to form three physical zones from the inner diameter of the disk (ZONE 1) to the outer diameter of the disk (ZONE 3).

Figure 2B:
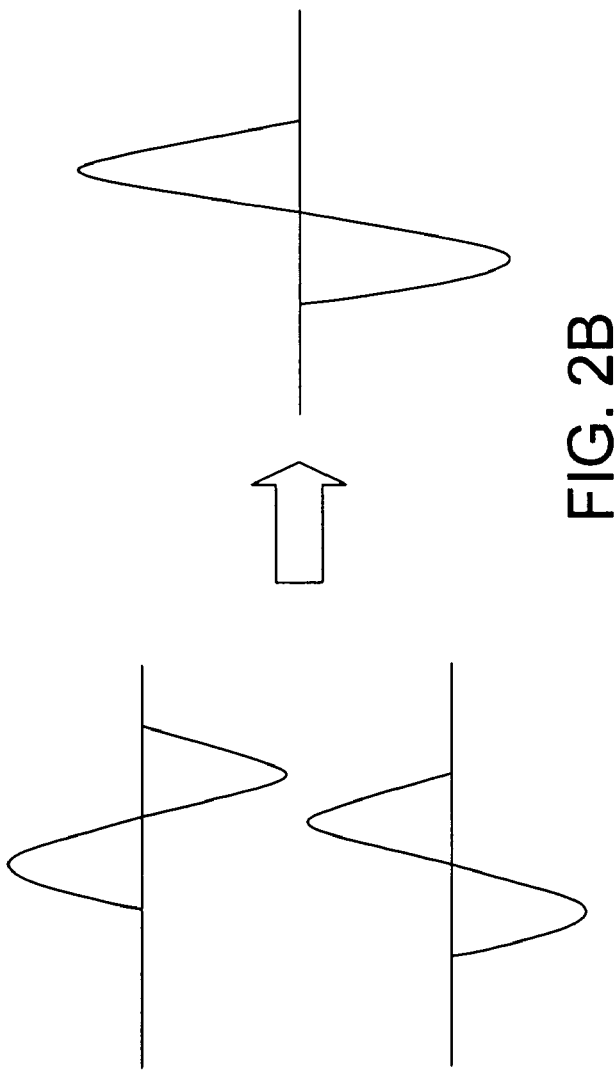
FIG. 2B shows an embodiment of the present invention wherein the first read signal is generated as the negative of the second read signal and phase shifted by a delay corresponding to an offset between the first and second read elements along the length of a data track.

The delay circuitry 22 and adder 24 of FIG. 1B may be implemented in any suitable manner. FIG. 2A shows an embodiment of the present invention wherein the first read signal 20A is generated by passing a biasing current through the first read element 8A, and the second read signal 20B is generated by passing a biasing current in the opposite direction through the second read element 8B. Therefore the second read signal 8A is generated as the negative of the first read signal 8B with a phase offset from the first read signal 8B corresponding to the physical offset (spacing) between the read elements 8A and 8B. In the embodiment of FIG. 2A, the delay circuitry comprises a suitable analog delay circuit 40 for delaying the first read signal 20A in continuous time, and the adder 24 (FIG. 1B) comprises a differential amplifier 42. As shown in FIG. 2B, after delaying the first read signal 20A by a phase shift corresponding to the read element offset, and subtracting the delayed read signal 26 from the second read signal 20B generates a combined read signal 28 having effectively twice the amplitude and twice the signal-to-noise ratio (SNR) as illustrated in FIG. 2B. The combined read signal 28 is demodulated using suitable read channel circuitry 29, and in an embodiment described in greater detail below, using a partial response maximum likelihood (PRML) read channel.

Figure 3:
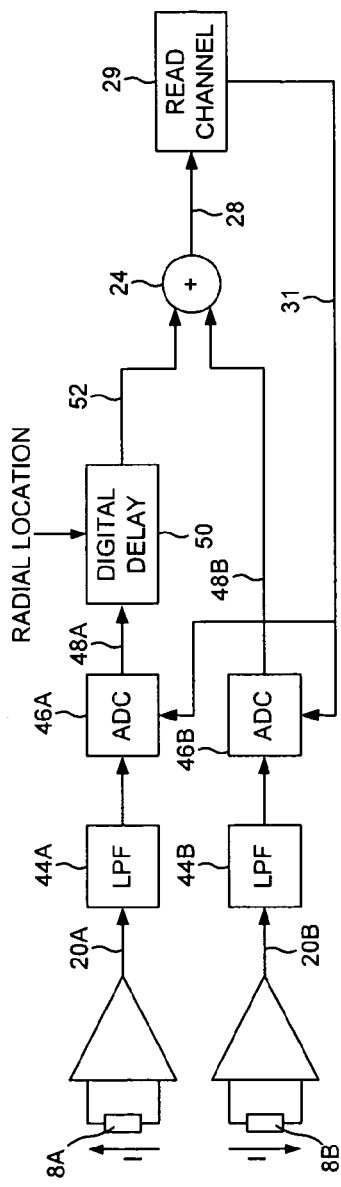
FIG. 3 shows an embodiment of the present invention wherein the first read signal is delayed in discrete time using a digital delay circuit.

FIG. 3 shows an embodiment of the present invention wherein the first read signal 20A is low pass filtered 44A and sampled 46A to generate first sample values 48A, and the second read signal 20B is low pass filtered 44B and sampled 46B to generate second sample values 48B. The first sample values 48A are delayed using digital delay circuitry 50 for delaying the first read signal 20A in discrete time. The delayed sample values 52 are combined 24 with the second sample values 48B (e.g., added or subtracted) to generate the combined read signal 28 that is demodulated by read channel circuitry 29. Any suitable digital delay circuitry 50 may be employed in the embodiments of the present invention, such as a phase-offset sampling clock for clocking the sampling device 46B relative to sampling device 46A, or an interpolating filter for phase shifting the first sample values 48A.

In the embodiment employing a PRML read channel, the read signal is typically equalized into a target response (e.g., PR4, EPR4, etc.) using an analog filter and/or a digital filter, and the equalized read signal demodulated by a discrete-time sequence detector. In one embodiment, the first read signal 20A is delayed (using analog and/or digital circuitry) prior to equalizing. The first read signal 20A may then be equalized after being delayed, or the combined read signal 28 may be equalized. In another embodiment, the first read signal 20A is equalized prior to being delayed (phase aligned to the second read signal 20B). In yet another embodiment, both the first and second read signals 20A and 20B may be equalized, and then the equalized read signals combined to generate the combined read signal 28. In one embodiment, the PRML read channel comprises an adaptive equalizer wherein adjusting the equalizer may be considered a component of delaying the first read signal 20A in order to phase align it to the second read signal 20B.

Figure 4:
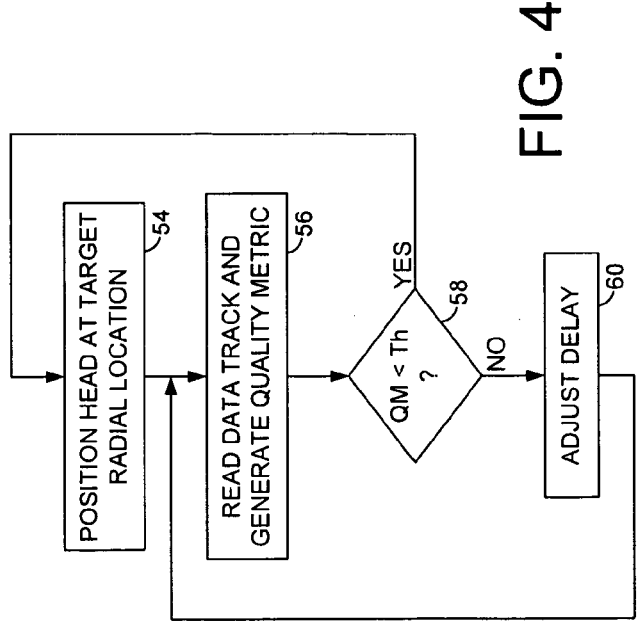
FIG. 4 is a flow diagram according to an embodiment of the present invention wherein the delay of the first read signal is calibrated over multiple radial locations of the disk.

In one embodiment, the degree to which the first read signal is delayed varies based on the radial location of the head. For example, the physical offset (spacing) between the first read element 8A and the second read element 8B may vary depending on the skew angle of the head 6. In addition, the data rate may change depending on the physical zone, and therefore the phase delay of an interpolating filter may be changed accordingly. FIG. 4 shows an embodiment of the present invention wherein the degree to which the first read signal is delayed is calibrated at multiple radial locations (e.g., for each physical zone) in response to the combined read signal 28. After positioning the head over the first target radial location (step 54), a data track is read in order to generate a quality metric (step 56). Any suitable quality metric may be generated, such as an amplitude of the combined read signal 28, mean squared error between read signal samples and target samples, bit error rate, etc. If the quality metric is less than a threshold (step 58), the delay circuit 22 is adjusted (step 60) and the process repeats until the quality metric exceeds the threshold (step 58). This process is then repeated for the multiple radial locations of the disk and the resulting delay values stored in a table. During normal operation, when the head 6 is positioned over a particular radial location, the corresponding delay value is read from the table and used to configure the delay circuit 22.

Any suitable read channel circuitry 29 may be employed in the embodiments of the present invention. In one embodiment, the disk drive employs a partial response maximum likelihood (PRML) read channel 29 wherein the combined read signal 28 is equalized according to a target response (PR4, EPR4, etc.) and then demodulated in discrete time using a maximum likelihood (or approximation thereof) sequence detector (e.g., a Viterbi detector). Timing recovery circuitry synchronizes the sample values of the read signal relative to expected values corresponding to the target response. Synchronizing the sample values may be implemented in any suitable manner, including to synchronize a sampling device (e.g., A/D converter) or to interpolate asynchronous sample values of the read signal. In one embodiment, the timing recovery circuitry is implemented within the read channel 29 by processing the sample values of the combined read signal 28 and generating a sampling clock 31 (FIG. 3) applied to the sampling devices 46A and 46B. In alternative embodiments described below, the timing recovery circuitry synchronizes the sample values of the first and second read signals 20A and 20B prior to combining 24 the sample values to generate the combined read signal 28 processed by the read channel 29.

FIG. 5A shows control circuitry according to an embodiment of the present invention comprising a first synchronous sampling timing recovery circuit 62A for synchronizing a first sampling clock 64A, and a second synchronous sampling timing recovery circuit 62B for synchronizing a second sampling clock 64B. The first synchronous samples 66A of the first read signal 20A are combined 24 with the second synchronous samples 66B of the second read signal 20B to generate the combined read signal 28. The synchronous sampling timing recovery circuits detect a phase error between the read signal samples and expected samples, wherein the phase error adjusts the phase/frequency of the sampling clock (e.g., by adjusting the frequency of a variable frequency oscillator). In this embodiment, the second sampling clock 64B will comprise a phase delay relative to the first sampling clock 64A that corresponds to the offset between the first and second read elements 8A and 8B. By clocking the combining circuit 24 and the read channel 29 with the second sampling clock 64B, the first read signal 20A is effectively delayed so that the synchronous samples 66A of the first read signal 20A substantially align with the synchronous samples 66B of the second read signal 20B.

FIG. 5B shows an alternative embodiment of the present invention comprising a synchronous sampling timing recovery circuit 68 for generating the first sampling clock 64A, and a phase delay circuit 70 for delaying the first sampling clock 64A to generate the second sampling clock 64B. The phase delay circuit 70 may be implemented in any suitable manner, such as with a digital delay line comprising a plurality of delay elements. In one embodiment, the degree to which the phase delay circuit 70 delays the first sampling clock 64A is programmable based on the radial location of the head, wherein the phase delay may be calibrated for different radial locations as described above.

Figure 5C:
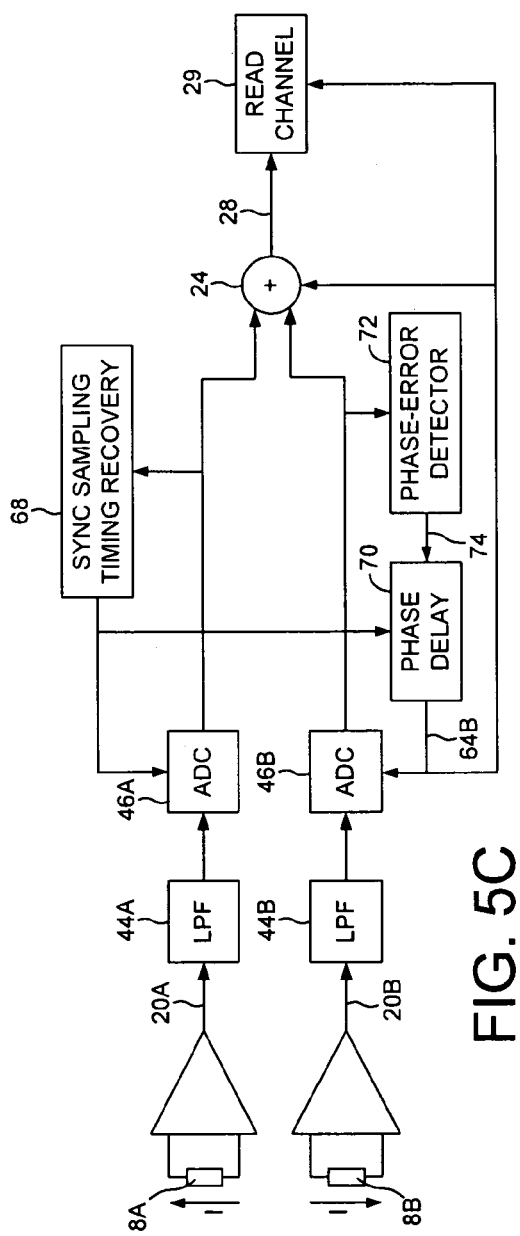
FIG. 5C shows control circuitry according to an embodiment of the present invention wherein the digital delay circuit is adjusted by a phase error detector.

In an alternative embodiment shown in FIG. 5C, a phase-error detector 72 detects a phase error 74 between the second synchronous sample values 66B and expected samples corresponding to a target response. The phase error 74 adjusts the phase delay circuit 70 in a direction that forces the phase error toward zero. Accordingly, rather than calibrate the phase delay for different radial locations, in this embodiment the phase delay is adjusted continuously to track changes across the radius of the disk, as well as changes in the angular velocity of the disk.

Figure 6:
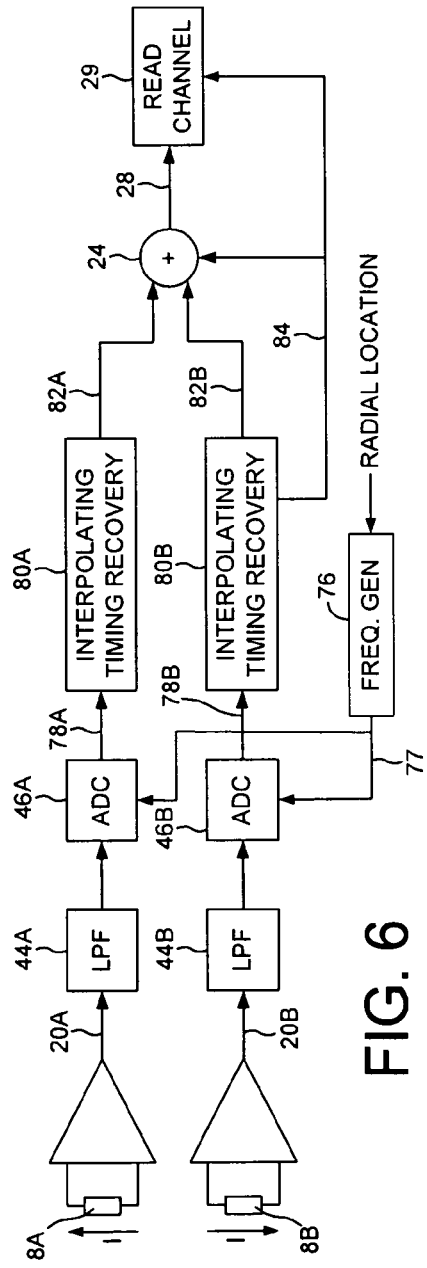
FIG. 6 shows control circuitry according to an embodiment of the present invention wherein both the first and second read signals are synchronized using interpolating timing recovery circuits.

FIG. 6 shows control circuitry according to another embodiment of the present invention wherein a frequency generator 76 generates a fixed clock 77 for clocking the first sampling device 46A to generate first asynchronous sample values 78A, and for clocking the second sampling device 46B to generate second asynchronous sample values 78B. A first interpolating timing recovery circuit 80A interpolates the first asynchronous sample values 78A to generate first synchronous sample values 82A, and a second interpolating timing recovery circuit 80B interpolates the second asynchronous sample values 78B to generate second synchronous sample values 82B that are combined 24 with the first synchronous sample values 82A to generate the combined read signal 28. Each interpolating timing recovery circuit 80A and 80B comprises a phase error detector and an interpolation filter for phase shifting the asynchronous sample values relative to the detected phase error. In the embodiment of FIG. 6, the second interpolating timing recovery circuit 80B generates a data clock 84 for clocking the combining circuit 24 and the read channel 29 at the data rate. Also in the embodiment of FIG. 6, the frequency generator 76 is adjusted based on the radial location of the head 6 to generate the fixed clock 77 at a frequency proximate the data rate of each physical zone. Sampling both read signals 20A and 20B using the same fixed clock 77 may reduce noise that may otherwise be injected into the read signals by the cross-talk of two clocks operating with a phase offset.

Any suitable number of read elements may be employed in the embodiments of the present invention. For example, the head may be fabricated with three read elements each offset along the length of a data track such that the resulting three read signals are phase offset. The circuitry in the above embodiments may be duplicated for each read element in order to phase align all of the read signals before being combined into the combined read signal.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of data tracks;
   a head actuated over the disk, the head comprising a first read element and a second read element; and
   control circuitry operable to:
   read a data track to generate a first read signal emanating from the first read element and a second read signal emanating from the second read element;
   delay the first read signal relative to the second read signal to generate a delayed read signal;
   combine the second read signal and the delayed read signal to generate a combined read signal;
   detect an estimated data sequence from the combined read signal;
   generate a quality metric in response to the combined read signal; and
   calibrate the delay in response to the quality metric.

2. The disk drive as recited in claim 1, wherein:
   the first read element is offset from the second read element along the length of a data track; and
   the delay corresponds to the offset.

3. The disk drive as recited in claim 1, wherein the control circuitry comprises an digital delay circuit for delaying the first read signal in discrete time.

4. The disk drive as recited in claim 1, wherein the control circuitry is further operable to calibrate the delay at a plurality of radial locations of the disk.

5. A method of operating a disk drive, the disk drive comprising a disk comprising a plurality of data tracks, and a head actuated over the disk, the head comprising a first read element and a second read element, the method comprising:
   reading a data track to generate a first read signal emanating from the first read element and a second read signal emanating from the second read element;
   delaying the first read signal relative to the second read signal to generate a delayed read signal;
   combining the second read signal and the delayed read signal to generate a combined read signal;
   detecting an estimated data sequence from the combined read signal;
   generating a quality metric in response to the combined read signal; and
   calibrating the delay in response to the quality metric.

6. The method as recited in claim 5, wherein:
   the first read element is offset from the second read element along the length of a data track; and
   the delay corresponds to the offset.

7. The method as recited in claim 5, further comprising delaying the first read signal in discrete time.

8. The method as recited in claim 5, further comprising calibrating the delay at a plurality of radial locations of the disk.

* * * * *